UNITED STATES PATENT OFFICE.

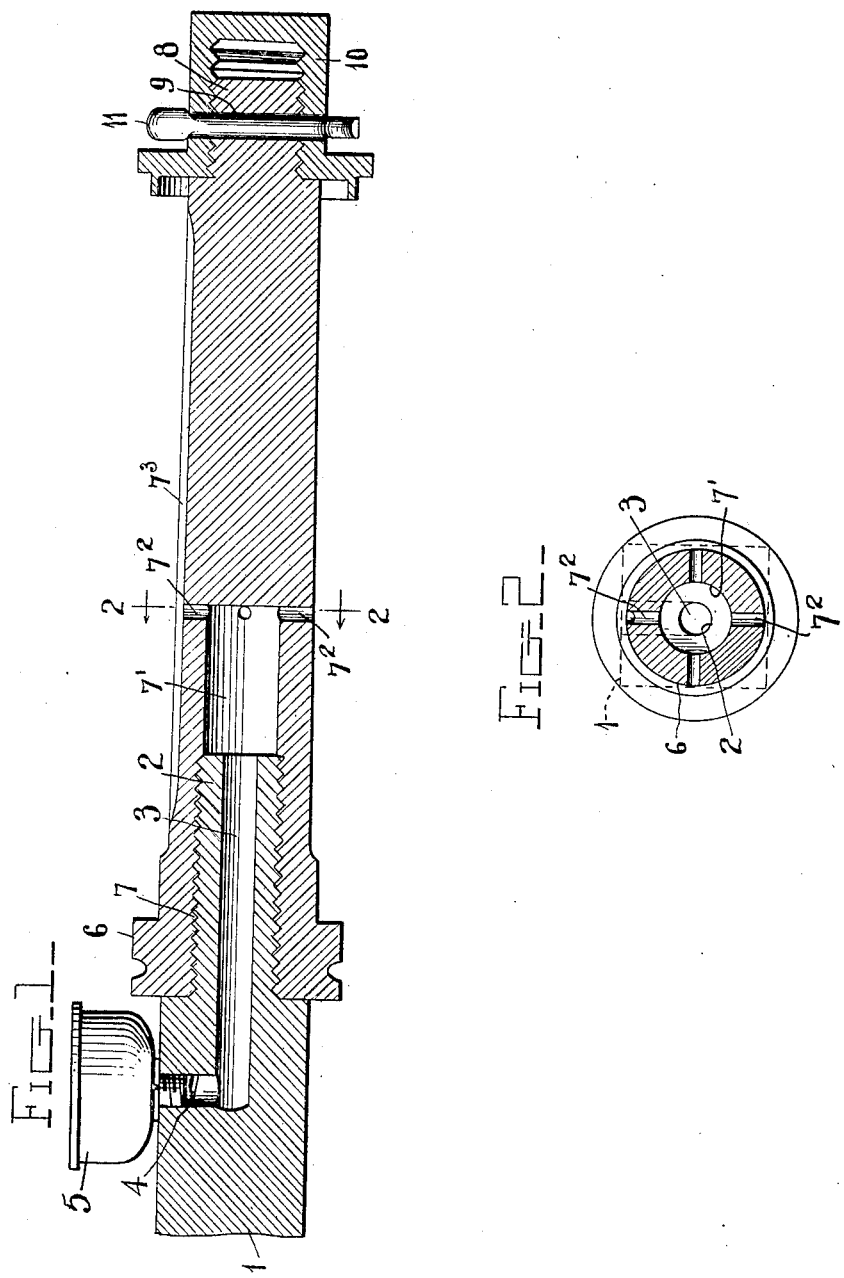

BENJAMIN F. WILLETT, OF WOODWARD, OKLAHOMA.

SELF-LUBRICATING VEHICLE-AXLE.

No. 887,561.        Specification of Letters Patent.        Patented May 12, 1908.

Application filed May 6, 1907. Serial No. 372,108.

*To all whom it may concern:*

Be it known that I, BENJAMIN F. WILLETT, a citizen of the United States, residing at Woodward, in the county of Woodward, Oklahoma, have invented certain new and useful Improvements in Self-Lubricating Vehicle-Axles; and I do declare the following to be a full, clear, and exact description of the invention, such as will enable others skilled in the art to which it appertains to make and use the same.

My invention has relation to new and useful improvements in self lubricating vehicle axles.

The object of the invention is to provide a vehicle axle with means for automatically feeding oil or other lubricant to the axle spindles.

With the foregoing and other objects in view which will appear as the nature of the invention is better understood, the invention consists in certain novel features of construction, combination and arrangement of parts as will be hereinafter fully described and claimed.

In the accompanying drawings, Figure 1 is a central longitudinal sectional view of a vehicle axle constructed in accordance with my invention; and Fig. 2 is a cross sectional view of the spindle on the line 2—2 of Fig. 1.

Referring more particularly to the drawings, an axle tree 1 is shown which terminates in an exteriorly threaded stem 2. This stem has a longitudinal bore 3 extending a suitable distance inward beyond the junction of said stem 2 with the axle tree body to provide an oil channel having at its inner end a laterally extending screw threaded bore 4 opening through the wall thereof to receive the screw threaded stem of an oil cup 5.

A solid axle spindle 6 is shown removably attached to the axle tree and is provided at one end with a socket 7 the interior of which is screw threaded for a portion of its length to engage the threads of said stem and the remaining portion of said socket is smooth to form an unobstructed passage for the lubricant and forming an oil chamber 7'. This oil chamber 7' communicates with the channel 3 in the axle tree when the parts are assembled and it is provided with a plurality of outlet ducts as $7^2$ at its outer end through which the oil escapes to the spindle. This spindle 6 is provided on its exterior with an oil conveying groove $7^3$ which extends the full length of the spindle and communicates with one of the outlet ducts as $7^2$ and forms a continuation of the oil chamber 7'. The outer end of the spindle is preferably reduced to provide a stem 8 having an exterior thread and an opening or aperture 9 extending transversely therethrough. A suitable nut 10 having two corresponding alined openings or apertures adapted to register with the opening or aperture 9 in said stem 8 is adapted to be screwed on to said stem to perform the function of the ordinary nut of an axle. A cotter pin 11 is adapted to be passed through the openings or apertures in said nut and the opening 9 in said stem 8 to more securely hold the nut against accidental disengagement from the stem.

In the application of my invention, a suitable lubricant is placed in the cup 5 and flows through the longitudinal oil chamber 3 in the end of the axle tree and through the circumferential series of oil ducts or perforations to the spindle. While I have shown and described but one end of the axle tree, one spindle and one nut, it will be obvious that both ends of the axle are similar in construction.

Having thus described my invention, what I claim as new is:—

The combination with an axle tree having an exteriorly screw-threaded stem provided with an oil bore extending therethrough, of a solid spindle having an oil chamber at its inner end, the interior of which is screw threaded for a portion of its length to engage the threads of said stem and the remaining portion of which is smooth to offer an unobstructed passage for the lubricant, said chamber having an outlet duct at its outer end, said spindle having an oil-conveying groove on its exterior extending the full length thereof and communicating with the outlet duct and forming a continuation of the oil chamber.

In testimony whereof I have hereunto set my hand in presence of two subscribing witnesses.

BENJAMIN F. WILLETT.

Witnesses:
    FRED SCHULTZ,
    FRANK K. TUCKER.